(12) United States Patent
Jeong et al.

(10) Patent No.: US 11,886,697 B2
(45) Date of Patent: Jan. 30, 2024

(54) DISPLAY APPARATUS AND CONTROL METHOD THEREOF

(71) Applicant: SAMSUNG ELECTRONICS CO., LTD., Suwon-si (KR)

(72) Inventors: Kijun Jeong, Suwon-si (KR); Hyunsig Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/838,898

(22) Filed: Jun. 13, 2022

(65) Prior Publication Data

US 2022/0308748 A1 Sep. 29, 2022

Related U.S. Application Data

(63) Continuation of application No. PCT/KR2021/013693, filed on Oct. 6, 2021.

(30) Foreign Application Priority Data

Oct. 14, 2020 (KR) .......................... 10-2020-0133003

(51) Int. Cl.
*G06F 3/04883* (2022.01)
(52) U.S. Cl.
CPC ................. *G06F 3/04883* (2013.01)
(58) Field of Classification Search
CPC .................................................. G06F 3/04883
See application file for complete search history.

(56) References Cited

U.S. PATENT DOCUMENTS

| | | |
|---|---|---|
| 5,427,455 A | 6/1995 | Bosley |
| 6,877,297 B2 | 4/2005 | Armington et al. |
| 7,218,226 B2 | 5/2007 | Wehrenberg |
| 7,918,808 B2 | 4/2011 | Simmons |
| 7,973,043 B2 | 7/2011 | Migaly |
| 8,409,024 B2 | 4/2013 | Marty et al. |
| 8,416,197 B2 | 4/2013 | Feng et al. |
| 8,723,820 B1 | 5/2014 | Han |
| 8,866,768 B2 | 10/2014 | Wang |
| 8,896,606 B2 | 11/2014 | Kim |
| 9,065,955 B2 | 6/2015 | Baba |

(Continued)

FOREIGN PATENT DOCUMENTS

| | | |
|---|---|---|
| CN | 1715615 | 1/2006 |
| CN | 1926496 | 3/2007 |

(Continued)

OTHER PUBLICATIONS

Search Report and Written Opinion dated Jan. 21, 2022 in International Application No. PCT/KR2021/013693.

*Primary Examiner* — Seth A Silverman
(74) *Attorney, Agent, or Firm* — Nixon & Vanderhye P.C.

(57) ABSTRACT

A display apparatus is disclosed. The display apparatus includes: a display panel including a touch sensor, and a processor configured to: based on receiving a touch input signal for an area of the display panel from the touch sensor, control the display panel to display a touch trajectory corresponding to the touch input signal in the area, and based on touch context information including speed information corresponding to the touch input signal, determine whether to display a subsequent trajectory of the displayed touch trajectory.

18 Claims, 13 Drawing Sheets

(56) References Cited

U.S. PATENT DOCUMENTS

| | | | |
|---|---|---|---|
| 9,083,694 | B2 | 7/2015 | Li et al. |
| 9,199,176 | B2 | 12/2015 | Iwamoto et al. |
| 9,323,454 | B2 | 4/2016 | Motoi |
| 9,563,348 | B2 | 2/2017 | Medlock et al. |
| 9,761,088 | B2 | 12/2017 | Kirnstotter |
| 9,881,149 | B2 | 1/2018 | Li et al. |
| 9,933,883 | B2 | 4/2018 | Kim et al. |
| 10,058,122 | B2 | 8/2018 | Steingraber et al. |
| 10,254,950 | B2 | 4/2019 | Yu et al. |
| 10,338,725 | B2 * | 7/2019 | Tu .................. G06F 3/0412 |
| 10,365,765 | B2 * | 7/2019 | Lee .................. G06F 3/0485 |
| 10,599,256 | B2 | 3/2020 | Kurabayashi |
| 11,222,445 | B2 | 1/2022 | Park et al. |
| 2012/0113007 | A1 * | 5/2012 | Koch .................. G06F 3/017 345/168 |
| 2013/0002600 | A1 * | 1/2013 | McCracken .......... G06F 3/04186 345/173 |
| 2013/0021272 | A1 * | 1/2013 | Wang .................. G06F 3/0416 345/173 |
| 2013/0342525 | A1 | 12/2013 | Benko et al. |
| 2015/0274170 | A1 | 10/2015 | Sun |
| 2015/0371417 | A1 | 12/2015 | Angelov et al. |
| 2016/0162061 | A1 * | 6/2016 | Worfolk .............. G06F 3/04883 345/173 |
| 2016/0291788 | A1 | 10/2016 | Johansson et al. |
| 2016/0364010 | A1 | 12/2016 | Amma et al. |
| 2019/0346985 | A1 * | 11/2019 | Roard .................. G06F 3/0486 |
| 2020/0372689 | A1 | 11/2020 | Park et al. |

FOREIGN PATENT DOCUMENTS

| | | |
|---|---|---|
| CN | 201105404 Y | 8/2008 |
| CN | 101509382 | 8/2009 |
| CN | 101596098 | 12/2009 |
| CN | 101852755 | 10/2010 |
| CN | 102097005 | 6/2011 |
| CN | 102494629 | 6/2012 |
| CN | 102582596 | 7/2012 |
| CN | 102591533 | 7/2012 |
| CN | 102635059 | 8/2012 |
| CN | 102890576 | 1/2013 |
| CN | 102934053 | 2/2013 |
| CN | 103032935 | 4/2013 |
| CN | 103218910 | 7/2013 |
| CN | 103236102 | 8/2013 |
| CN | 103353296 | 10/2013 |
| CN | 103760113 | 4/2014 |
| CN | 103959350 | 7/2014 |
| CN | 104104718 | 10/2014 |
| CN | 104363159 | 2/2015 |
| CN | 104463284 | 3/2015 |
| CN | 104598155 | 5/2015 |
| CN | 104660819 | 5/2015 |
| CN | 105051494 | 11/2015 |
| CN | 105151340 | 12/2015 |
| CN | 105257277 | 1/2016 |
| CN | 105281998 | 1/2016 |
| CN | 105390029 | 3/2016 |
| CN | 105518587 | 4/2016 |
| CN | 105548006 | 5/2016 |
| CN | 105554059 | 5/2016 |
| CN | 205418156 U | 8/2016 |
| CN | 105955525 | 9/2016 |
| CN | 106093321 | 11/2016 |
| CN | 106140648 | 11/2016 |
| CN | 106710007 | 5/2017 |
| CN | 107505392 | 12/2017 |
| CN | 107512597 | 12/2017 |
| CN | 107673083 | 2/2018 |
| CN | 107684847 | 2/2018 |
| CN | 107715727 | 2/2018 |
| CN | 107817122 | 3/2018 |
| CN | 108605158 | 3/2020 |
| EP | 0756672 | 9/2001 |
| EP | 2549365 | 1/2018 |
| EP | 2960761 | 11/2019 |
| JP | H08-292942 | 11/1996 |
| JP | 2002-109473 | 4/2002 |
| JP | 2011-100282 | 5/2011 |
| JP | 2014-056505 | 3/2014 |
| JP | 5712400 | 5/2015 |
| JP | 5906345 | 4/2016 |
| JP | 6034138 | 11/2016 |
| JP | 2017-516176 | 6/2017 |
| JP | 2017-129890 | 7/2017 |
| JP | 6275904 | 2/2018 |
| JP | 6304319 | 4/2018 |
| JP | 6665262 | 3/2020 |
| KR | 10-0869712 | 11/2008 |
| KR | 10-2011-0133787 | 12/2011 |
| KR | 10-1499388 | 3/2015 |
| KR | 10-1566509 | 11/2015 |
| KR | 10-2017-0033656 | 3/2017 |
| KR | 10-2019-0046467 | 5/2019 |
| KR | 10-2043148 | 11/2019 |
| WO | 2008/097024 | 8/2008 |
| WO | 2014/151153 | 9/2014 |

* cited by examiner

< HORIZONTAL MODE >

< VERTICAL MODE >

DISPLAY APPARATUS AND CONTROL METHOD THEREOF

CROSS-REFERENCE TO RELATED APPLICATIONS

This application is a continuation of International Application No. PCT/KR2021/013693 designating the United States, filed on Oct. 6, 2021, in the Korean Intellectual Property Receiving Office and claiming priority to Korean Patent Application No. 10-2020-0133003, filed on Oct. 14, 2020, in the Korean Intellectual Property Office, the disclosures of which are incorporated by reference herein in their entireties.

BACKGROUND

Field

The disclosure relates to a display apparatus and a control method thereof, and for example, to a display apparatus that displays a touch trajectory, and a control method thereof.

Description of Related Art

Recently, spurred by the development of technologies in the field of display apparatuses, display apparatuses in various types are being developed and distributed. In particular, following the flow of e-learning of utilizing electronic apparatuses in the field of education, electronic white board apparatuses wherein display apparatuses and white boards are combined are being used a lot.

In the case of an electronic white board, there is a problem that a gap is generated between a time point of writing (or, touching) and a time point when a trajectory corresponding to the writing is displayed on a screen, and for minimizing or reducing such a problem, a display apparatus provides an effect as if a trajectory is displayed on a screen at the same time that a user is writing, using various prediction algorithms.

However, such prediction algorithms have a limitation that a trajectory similar to an actual touch input can be predicted only in an environment wherein a touch trajectory in a straight line is displayed.

In other environments excluding the limited environment, there is a problem that a prediction trajectory rather impedes a user. Accordingly, there is an increasing need for a method of predicting a trajectory limited to a case wherein prediction is required, and displaying the predicted trajectory and thereby minimizing or reducing the aforementioned problem that a gap is generated.

SUMMARY

Embodiments of the disclosure address the aforementioned need, and provide a display apparatus that determines whether prediction of a trajectory according to a touch input is required, and displays a prediction trajectory based on the determination result, and a control method thereof.

According to an example embodiment of the disclosure, a display apparatus includes: a display panel including a touch sensor, and a processor configured to: based on receiving a touch input signal for an area of the display panel from the touch sensor, control the display panel to display a touch trajectory corresponding to the touch input signal in the area, and based on touch context information including speed information corresponding to the touch input signal, determine whether to display a subsequent trajectory of the displayed touch trajectory.

The processor may also be configured to: based on the speed information being less than a first threshold speed, predict the subsequent trajectory based on the displayed touch trajectory and display the trajectory, and based on the speed information being greater than or equal to the first threshold speed, control the display panel to display a touch trajectory corresponding to a subsequent touch input signal received from the touch sensor.

The processor may also be configured to: based on the speed information being less than the first threshold speed and greater than or equal to a second threshold speed, predict a subsequent trajectory corresponding to a first area based on the displayed touch trajectory and display the trajectory, and based on the speed information being less than the second threshold speed, predict a subsequent trajectory corresponding to a second area based on the displayed touch trajectory and display the trajectory. The size of the second area may be greater than the size of the first area.

The touch context information may further include at least one of information on an arrangement mode of the display apparatus, information on an area wherein the touch input was received, information on a set language of the display apparatus, or information on a content type corresponding to the touch input.

The processor may be configured to: based on a value acquired by applying different weights to the plurality of respective information included in the touch context information exceeding a threshold value, predict the subsequent trajectory based on the displayed touch trajectory and display the trajectory.

The information on the arrangement mode of the display apparatus may include a horizontal mode or a vertical mode, and the processor may be configured to: based on the display apparatus being in the vertical mode, predict the subsequent trajectory based on the displayed touch trajectory and control the display panel to display the trajectory, and based on the display apparatus being in the horizontal mode, control the display panel to display a touch trajectory corresponding to the subsequent touch input signal received from the touch sensor.

The information on the area wherein the touch input was received may include an upper area or a lower area, and the processor may be configured to: based on the area wherein the touch input was received being the lower area, predict the subsequent trajectory based on the displayed touch trajectory and control the display panel to display the trajectory, and based on the area wherein the touch input was received being the upper area, control the display panel to display a touch trajectory corresponding to the subsequent touch input signal received from the touch sensor.

The information on the content type corresponding to the touch input may include a text type or an image type, and the processor may be configured to: based on the content corresponding to the touch input being the image type, predict the subsequent trajectory based on the displayed touch trajectory and control the display panel to display the trajectory, and based on the content corresponding to the touch input being the text type, control the display panel to display a touch trajectory corresponding to the subsequent touch input signal received from the touch sensor.

The processor may be configured to: based on an error between the touch trajectory corresponding to the subsequent touch input signal received from the touch sensor and the subsequent trajectory exceeding a threshold range based on the subsequent trajectory being displayed, replace the displayed subsequent trajectory with the touch trajectory corresponding to the touch input signal and control the display panel to display the trajectory.

The display apparatus may further include: a memory storing use history information related to the touch input of the display panel, and the processor may be configured to determine whether to display a subsequent trajectory of the displayed touch trajectory based on the use history information.

According to an example embodiment of the disclosure, a method of controlling a display apparatus including a display panel wherein a touch sensor is provided includes: based on receiving a touch input signal for an area of the display panel from the touch sensor, displaying a touch trajectory corresponding to the touch input signal for the area, and based on touch context information including speed information corresponding to the touch input signal, determining whether to display a subsequent trajectory of the displayed touch trajectory.

The method may further include: based on the speed information being less than a first threshold speed, predicting the subsequent trajectory based on the displayed touch trajectory and displaying the trajectory, and based on the speed information being greater than or equal to the first threshold speed, displaying a touch trajectory corresponding to a subsequent touch input signal received from the touch sensor.

The predicting the subsequent trajectory and displaying the trajectory may include: based on the speed information being less than the first threshold speed and greater than or equal to a second threshold speed, predicting a subsequent trajectory corresponding to a first area based on the displayed touch trajectory and displaying the trajectory, and based on the speed information being less than the second threshold speed, predicting a subsequent trajectory corresponding to a second area based on the displayed touch trajectory and displaying the trajectory. The size of the second area may be greater than the size of the first area.

The touch context information may further include at least one of information on an arrangement mode of the display apparatus, information on an area wherein the touch input was received, information on a set language of the display apparatus, or information on a content type corresponding to the touch input.

The method may further include: based on a value acquired by applying different weights to the plurality of respective information included in the touch context information exceeding a threshold value, predicting the subsequent trajectory based on the displayed touch trajectory and displaying the trajectory.

The information on the arrangement mode of the display apparatus may include a horizontal mode or a vertical mode, and the method may further include: based on the display apparatus being in the vertical mode, predicting the subsequent trajectory based on the displayed touch trajectory and displaying the trajectory, and based on the display apparatus being in the horizontal mode, displaying a touch trajectory corresponding to the subsequent touch input signal received from the touch sensor.

The information on the area wherein the touch input was received may include an upper area or a lower area, and the method may further include: based on the area wherein the touch input was received being the lower area, predicting the subsequent trajectory based on the displayed touch trajectory and displaying the trajectory, and based on the area wherein the touch input was received being the upper area, displaying a touch trajectory corresponding to the subsequent touch input signal received from the touch sensor.

The information on the content type corresponding to the touch input may include a text type or an image type, and the method may further include: based on the content corresponding to the touch input being the image type, predicting the subsequent trajectory based on the displayed touch trajectory and displaying the trajectory, and based on the content corresponding to the touch input being the text type, displaying a touch trajectory corresponding to the subsequent touch input signal received from the touch sensor.

The method may further include based on an error between the touch trajectory corresponding to the subsequent touch input signal received from the touch sensor and the subsequent trajectory exceeding a threshold range based on the subsequent trajectory being displayed, replacing the displayed subsequent trajectory with the touch trajectory corresponding to the touch input signal and displaying the trajectory.

The display apparatus may include use history information related to the touch input of the display panel, and the method may further include determining whether to display a subsequent trajectory of the displayed touch trajectory based on the use history information.

According to the various example embodiments of the disclosure, in a case wherein prediction of a trajectory according to a touch input is required, the trajectory may be predicted and displayed.

As a predicted trajectory may be identical to a touch trajectory according to an actual touch history, or similar to the touch trajectory within a threshold range, reliability for the predicted trajectory can be improved, and user convenience can be increased.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
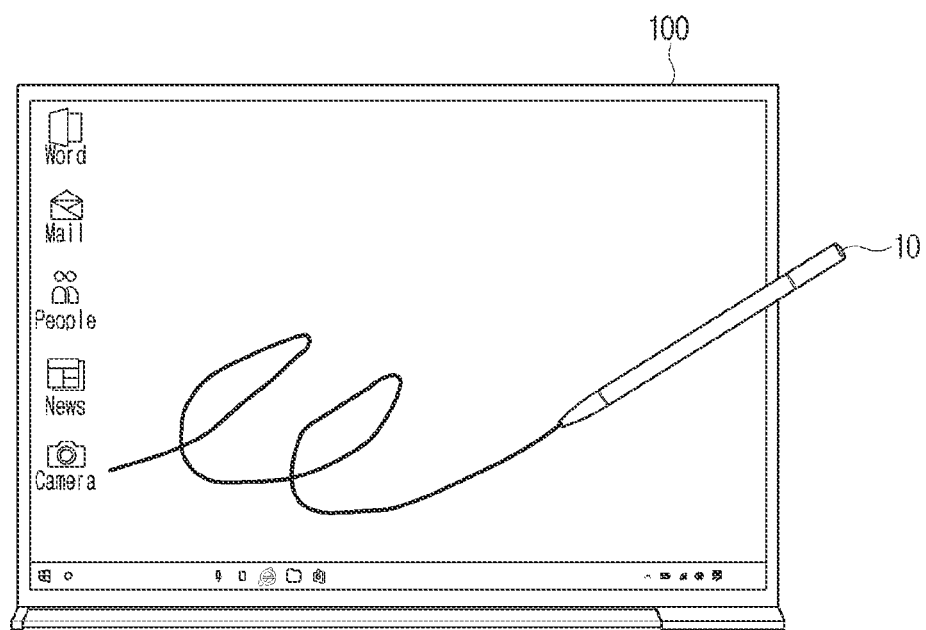
FIG. 1 is a diagram illustrating a display apparatus according to various embodiments.

First, terms used in the disclosure will be described briefly, and then the disclosure will be described in greater detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. In various cases, there may be terms that may be arbitrarily selected, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Various modifications may be made to the embodiments of the disclosure, and there may be various types of embodiments. Accordingly, example embodiments will be illustrated in drawings, and the embodiments will be described in greater detail in the detailed description. However, it should be noted that the various embodiments are not for limiting the scope of the disclosure to a specific embodiment, but they should be interpreted to include all modifications, equivalents, or alternatives of the embodiments included in the idea and the technical scope disclosed herein. In addition, in describing the embodiments, where it is determined that detailed explanation of related known technologies may unnecessarily obscure the gist of the disclosure, the detailed explanation may be omitted.

Terms such as "first," "second" and the like may be used to describe various components, but the components are not intended to be limited by the terms. The terms are used only to distinguish one component from another component.

Singular expressions include plural expressions, unless defined differently in the context. Further, in the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In the disclosure, "a module" or "a unit" may perform at least one function or operation, and may be implemented as hardware or software, or as a combination of hardware and software. In addition, a plurality of "modules" or "units" may be integrated into at least one module and implemented as at least one processor (not shown), excluding "a module" or "a unit" that needs to be implemented as specific hardware.

Hereinafter, various example embodiments of the disclosure will be described in greater detail with reference to the accompanying drawings. However, it should be noted that the disclosure may be implemented in various different forms, and is not limited to the embodiments described herein. In the drawings, parts that are not related to explanation may be omitted, for explaining the disclosure clearly, and throughout the disclosure, similar components were designated by similar reference numerals.

FIG. 1 is a diagram illustrating an example display apparatus according to various embodiments.

A display apparatus 100 according to an embodiment of the disclosure may display contents in various types. According to an embodiment, the display apparatus 100 may be implemented as an electric (electronic) white board display, but is not limited thereto. For example, the display apparatus 100 can be applied to any apparatus equipped with a display function such as, for example, and without limitation, a video wall, a large format display (LFD), digital signage, a digital information display (DID), a projector display, etc. The display apparatus 100 may be implemented as displays in various forms such as, for example, and without limitation, a liquid crystal display (LCD), organic light-emitting diodes (OLED), liquid crystal on silicon (LCoS), digital light processing (DLP), a quantum dot (QD) display panel, quantum dot light-emitting diodes (QLED), micro light-emitting diodes (μLED), mini LED, etc. The display apparatus 100 may be implemented as, for example, and without limitation, a touch screen combined with a touch sensor, a flexible display, a rollable display, a 3D display, a display to which a plurality of display modules are physically connected, etc.

For convenience of explanation, explanation will be made by way of non-limiting example based on the assumption of a case wherein the display apparatus 100 is implemented as an electronic white board. The display apparatus 100 may be arranged in a wall mounted form, or implemented as a stand form.

The display apparatus 100 according to an embodiment of the disclosure may provide a writing function. The writing function may refer, for example, to a function of, if a touch input signal for the display apparatus is received, drawing a line according to the touched path based on the touch input signal. Referring to FIG. 1, the display apparatus 100 may receive a touch input signal based on a touch input using a pen 10, and display a touch trajectory corresponding to the touch input signal. FIG. 1 is illustrated on the assumption of a touch input using the pen 10, for the convenience of explanation, but a touch input can be performed through a user's hand and not the pen 10, various objects that can touch the display apparatus 100, etc.

In case the display apparatus 100 displays a touch trajectory corresponding to a touch input signal, the time point of the touch input using the pen 10 and the time point when the touch trajectory is displayed may not coincide with each other.

For example, a specific time may be spent for the display apparatus 100 to display a touch trajectory corresponding to a touch input signal after the display apparatus 100 receives the touch input signal. The specific time may also be referred to as a latency, a delay time, a reaction speed, etc.

The display apparatus 100 according to an embodiment of the disclosure may display a touch trajectory corresponding to a touch input signal, and predict a subsequent trajectory based on the touch input signal or the touch trajectory. The display apparatus 100 may display the predicted subsequent trajectory. In this case, the display apparatus 100 may provide an effect as if a touch trajectory corresponding to the subsequent touch input is displayed at the same time as the subsequent touch input, e.g., as if a delay time was not generated to the user.

However, the display apparatus 100 may provide an effect as if a delay time was not generated to the user limited to a case wherein a touch trajectory corresponding to the subsequent touch input is identical to the predicted subsequent trajectory, or similar within a threshold range. As another example, if a difference between the touch trajectory corresponding to the subsequent touch input and the predicted subsequent trajectory exceeds the threshold range, there is a problem that the display apparatus 100 rather causes inconvenience to the user.

Accordingly, the display apparatus 100 according to the various embodiments of the disclosure may determine whether to predict a subsequent trajectory and display the trajectory based on context information regarding a user's touch input. Hereinafter, various example embodiments regarding touch context information will be described.

Figure 2:
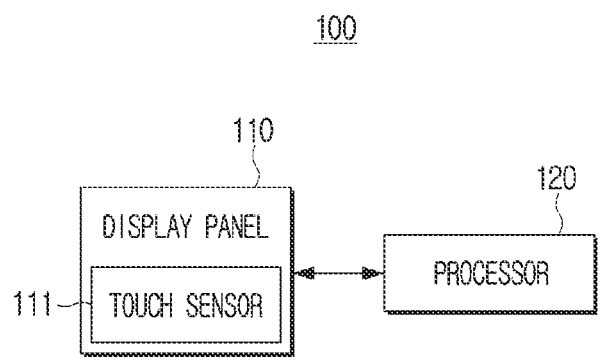
FIG. 2 is a block diagram illustrating an example configuration of a display apparatus according to various embodiments.

FIG. 2 is a block diagram illustrating an example configuration of a display apparatus according to various embodiments.

Referring to FIG. 2, the display apparatus 100 according to an embodiment of the disclosure includes a display panel 110 including a touch sensor 111 and a processor (e.g., including processing circuitry) 120.

The display panel 110 displays a screen. For example, if the display apparatus 100 is implemented as an electronic white board, the display panel 110 may display a screen for setting and execution of functions of the electronic white board. As an example, the display panel 110 may display a screen including, for example, and without limitation, at least one of a wallpaper, application icons, application execution windows, toolbar menus, setting menus, a campus drawing pictures, graphic objects, or the like.

A touch sensor 111 according to an embodiment may detect a touch for the display panel 110. For example, the touch sensor 111 may detect a touch that any object contacts the display panel 110. The touch sensor 111 may detect touches of all objects that contacted the display panel 110, or detect only touches of some objects having limited characteristics. Limitation of objects of which touches can be detected by the touch sensor 111 varies according to a method of detecting a touch. For example, the method by which the touch sensor 111 detects a touch may be implemented, for example, and without limitation, as an infrared method using an IR sensor (an infrared touch screen), an ultrasonic method (a surface acoustic wave touch screen), a resistive method (a resistive touch screen) (or a decompressive method), or a capacitive touch method (a capacitive touch screen), etc.

If a touch for an area of the display panel 110 is detected, the touch sensor 111 according to an embodiment may generate a touch input signal and transmit the signal to the processor 120. Methods of detecting a touch are not limited to the aforementioned examples, and the touch sensor 111 may detect a touch by various methods. For example, the touch sensor 111 may include a camera, etc., and can detect a touch for an area of the display panel 110 based on an image photographed by the camera.

The processor 120 may include various processing circuitry and controls the overall operations of the display apparatus 100. The processor 120 may include one or a plurality of processors. For example, the processor 120 may perform operations of the display apparatus 100 according to the various embodiments of the disclosure by executing at least one instruction stored in a memory (not shown).

According to an embodiment, the processor 120 may be implemented, for example, and without limitation, as a digital signal processor (DSP) processing digital image signals, a microprocessor, a graphics processing unit (GPU), an artificial intelligence (AI) processor, a neural processing unit (NPU), a time controller (TCON), or the like. However, the disclosure is not limited thereto, and the processor 120 may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined by the terms. The processor 120 may be implemented as a system on chip (SoC) having a processing algorithm stored therein or large scale integration (LSI), or in the form of an application specific integrated circuit (ASIC), or a field programmable gate array (FPGA).

For example, as illustrated in FIG. 1, if a touch input signal for an area of the display panel 110 is received from the touch sensor 111, the processor 120 according to an embodiment of the disclosure may control the display panel 110 to display a touch trajectory corresponding to the touch input signal in the area of the display panel 110.

The processor 120 according to an embodiment of the disclosure may determine whether to display a subsequent trajectory of the displayed touch trajectory based on touch context information corresponding to the touch input signal.

Explanation in this regard will be made in greater detail below with reference to FIG. 3.

Figure 3:
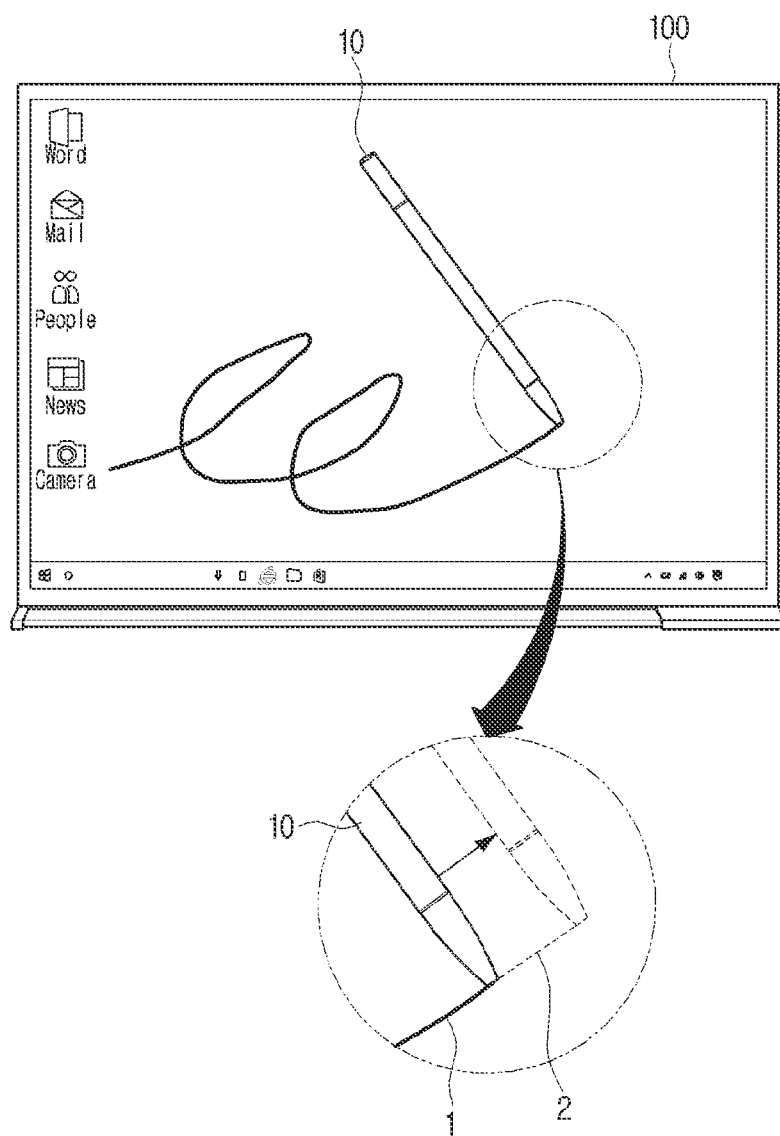
FIG. 3 is a diagram illustrating a subsequent trajectory according to various embodiments.

FIG. 3 is a diagram illustrating a subsequent trajectory according to various embodiments.

Referring to FIG. 3, the processor 120 according to an embodiment of the disclosure may control the display panel 110 to display a touch trajectory 1 corresponding to a touch input signal. The processor 120 may determine whether to display a subsequent trajectory 2 of the displayed touch trajectory 1 based on touch context information corresponding to the touch input signal.

For example, the processor 120 may predict the subsequent trajectory 2 based on the touch input signal or the touch trajectory 1 corresponding to the touch input signal. The processor 120 may determine whether to display the predicted subsequent trajectory 2 based on the touch context information corresponding to the touch input signal.

For example, the processor 120 may acquire a changed amount of the vector of the touch trajectory 1 corresponding to the touch input signal, and predict the subsequent trajectory 2 based on the changed amount of the vector. As an example, if the touch trajectory corresponding to the touch input signal is a trajectory in a straight line, the processor 120 may predict a subsequent trajectory 2 in a straight line that is consecutively continued from the touch trajectory 1. As another example, if the touch trajectory 1 corresponding to the touch input signal is a circular trajectory, the processor 120 may predict a circular subsequent trajectory 2 that is consecutively continued from the touch trajectory 1.

The processor 120 may determine whether to display the predicted subsequent trajectory 2 based on the touch context information. The touch context information may include speed information corresponding to the touch input signal. For example, the processor 120 may identify a touch input speed on the display panel 110 based on the touch context information. If the identified input speed is less than a first threshold speed based on the speed information, the processor 120 may predict the subsequent trajectory 2 based on the touch trajectory 1, and display the trajectory.

As another example, if the identified input speed is greater than or equal to the first threshold speed based on the speed information, the processor 120 may not predict the subsequent trajectory 2 based on the touch trajectory 1, or may not display the predicted subsequent trajectory 2. In this case, the processor 120 may control the display panel 110 to display a touch trajectory corresponding to the subsequent touch input signal received from the touch sensor 111.

The first threshold speed may be a speed corresponding to an operation time required for the processor 120 to predict the subsequent trajectory 2. For example, if the touch input speed is less than the first threshold speed, the processor 120 may perform an operation of predicting the subsequent trajectory 2 based on the changed amount of the vector of the touch trajectory 1, and control the display panel 110 to display the predicted subsequent trajectory 2. As the display panel 110 displays the predicted subsequent trajectory 2, the display apparatus 100 may provide an effect as if a touch trajectory corresponding to the subsequent touch input is displayed at the same time as the subsequent touch input using the pen 10 (or, with a very little delay time) to the user.

The aforementioned embodiment is merely an example, and an opposite case of the aforementioned embodiment is possible. For example, according to the setting of the manufacturer or a user, if the speed information is greater than or equal to the first threshold speed, the processor 120 can predict the subsequent trajectory and display the trajectory, and if the speed information is less than the first threshold speed, the processor 120 can display a touch trajectory corresponding to a subsequent touch input signal, but not a subsequent trajectory. As an example, if the identified touch input speed is greater than or equal to the first threshold speed based on the speed information included in the touch context information, the processor 120 may predict the subsequent trajectory 2 based on the touch trajectory 1, and display the trajectory. If the identified touch input speed is less than the first threshold speed based on the speed information, the processor 120 may not predict the subsequent trajectory 2. For example, if a user is performing a touch at a relatively fast speed, the processor 120 may predict the subsequent trajectory 2 and display the trajectory for providing an effect as if a touch trajectory is displayed at the same time as the touch to the user by minimizing and/or reducing a delay time between the time point of the touch and the time point when a touch trajectory corresponding to the touch is displayed. In this case, the first threshold speed can be set arbitrarily by the manufacturer or the user.

Hereinafter, for convenience of explanation, explanation will be made based on the assumption of a case wherein, in case the speed information is less than the first threshold speed, the processor 120 predicts the subsequent trajectory 2 based on the touch trajectory 1 and displays the trajectory, according to the setting of the manufacturer or a user.

If the speed information is less than the first threshold speed and greater than or equal to a second threshold speed, the processor 120 according to an embodiment of the disclosure may predict the subsequent trajectory 2 corresponding to a first area based on the displayed touch trajectory 1, and display the trajectory.

As another example, if the speed information is less than the second threshold speed, the processor 120 may predict the subsequent trajectory 2 corresponding to a second area based on the displayed touch trajectory 1, and display the trajectory. The size of the second area may be greater than the size of the first area. For example, as the touch input speed is relatively slower, the operation amount that the processor 120 should process to predict the subsequent trajectory 2 may increase. As the touch input speed is slower, the processor 120 may predict a longer subsequent trajectory 2, e.g., a subject trajectory 2 as much as the second area.

For example, a case wherein the first threshold speed is 35 mm/s and the second threshold speed is 25 mm/s may be assumed. If the speed information is less than the first threshold speed and greater than or equal to the second threshold speed, the processor 120 may predict a subsequent trajectory 2 in a length of 5 mm 5 mm may refer, for example, to the size of the first area.

As another example, if the speed information is less than the second threshold speed, the processor 120 may predict a subsequent trajectory 2 of a length of 10 mm during the same operation time. 10 mm may refer, for example, to the size of the second area. However, the aforementioned specific numbers are merely examples, and the processor 120 may predict a subsequent trajectory 2 of a relatively long length during the same time as the speed information corresponding to a touch input is slower.

FIG. 3 illustrates that the processor 120 determines whether to display the subsequent trajectory 2 of the touch trajectory 1 only based on speed information of a touch input included in the touch context information, for the convenience of explanation. However, this is merely an example, and the processor 120 may determine whether to display the subsequent trajectory 2 based on various kinds of information related to a touch included in the touch context information.

Hereinafter, various kinds of information related to a touch included in the touch context information will be described in greater detail with reference to the drawings.

Figure 4:
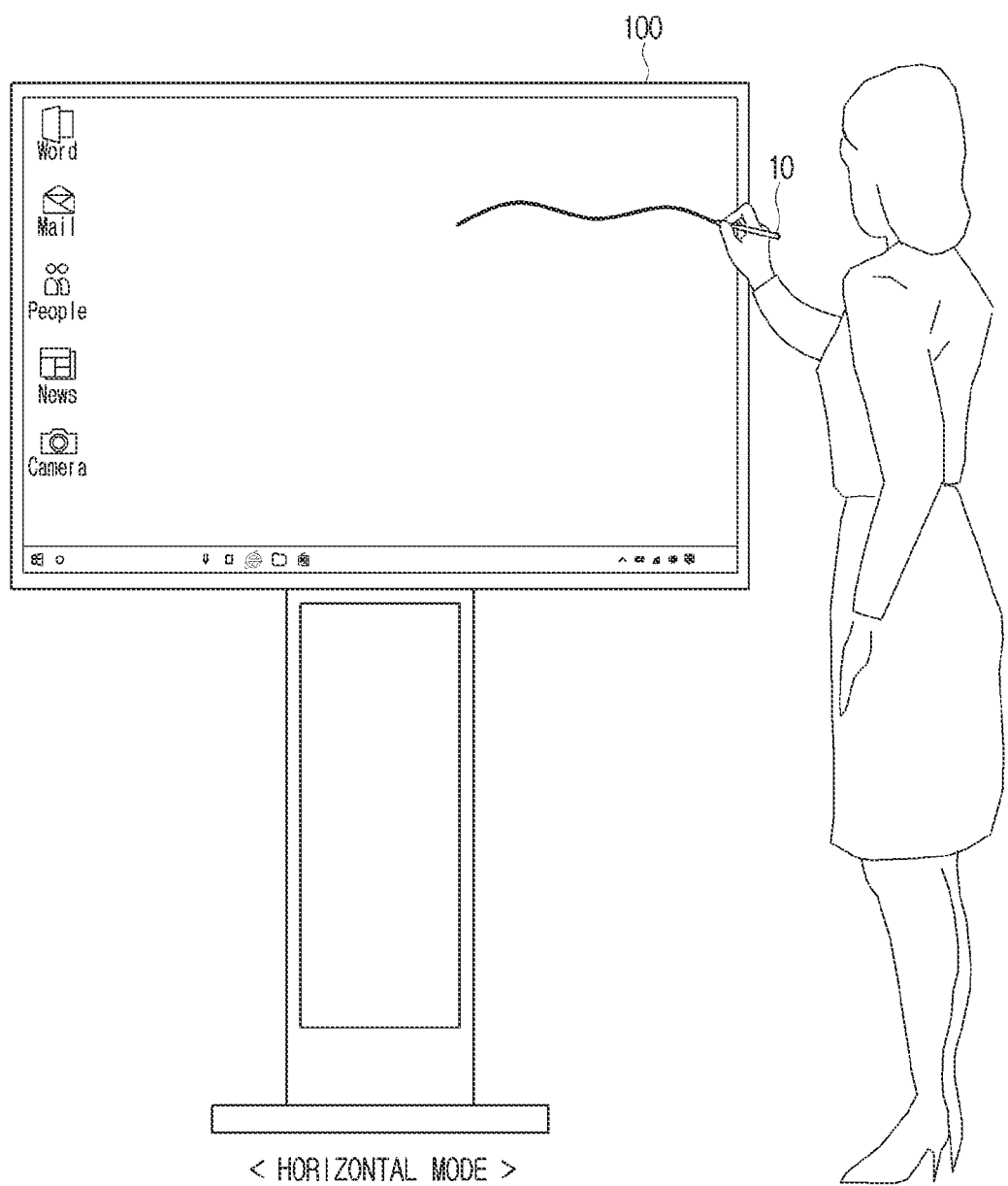
FIG. 4 and FIG. 5 are diagrams illustrating an arrangement mode according to various embodiments.
Figure 5:
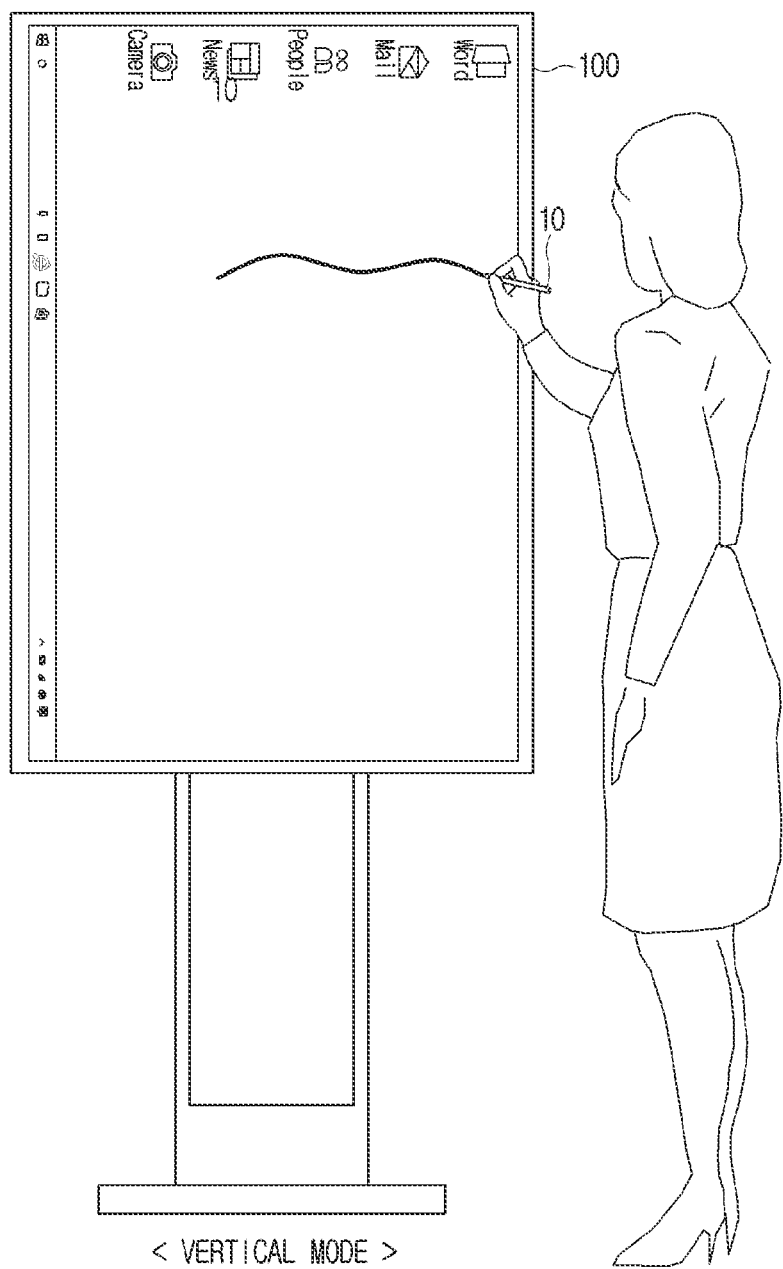

FIG. 4 and FIG. 5 are diagrams illustrating an arrangement mode according to various embodiments.

The processor 120 according to an embodiment of the disclosure may determine whether to display the subsequent trajectory 2 of the touch trajectory 1 based on information on an arrangement mode. Here, the information on the arrangement mode may include a horizontal mode or a vertical mode.

Referring to FIG. 4, if the display apparatus 100 is in a horizontal mode based on the information on the arrangement mode, the processor 120 according to an embodiment of the disclosure may display a touch trajectory corresponding to a subsequent touch input signal received from the touch sensor 111.

As another example, referring to FIG. 5, if the display apparatus 100 is in a vertical mode based on the information on the arrangement mode, the processor 120 according to an embodiment of the disclosure may predict the subsequent trajectory 2 based on the displayed touch trajectory 1, and control the display panel 110 to display the trajectory.

FIG. 4 and FIG. 5 assume that the touch input speed will be relatively slower when the display apparatus 100 is in the vertical mode than when the display apparatus 100 is in the horizontal mode, and illustrate that the processor 120 predicts the subsequent trajectory 2 and displays the trajectory when the display apparatus 100 is in the vertical mode, for convenience of explanation. However, this is merely an example, and the disclosure is not limited thereto. For example, when the display apparatus 100 is in the vertical mode, the processor 120 may display a touch trajectory corresponding to a subsequent touch input signal received from the touch sensor 111, and if the display apparatus 100 is in the horizontal mode, the processor 120 may predict the subsequent trajectory 2 based on the displayed touch trajectory 1, and display the trajectory.

For example, according to the setting of the manufacturer or a user, the processor 120 may predict the subsequent trajectory 2 and display the trajectory limited to a case wherein the display apparatus 100 falls under any one of the vertical mode or the horizontal mode.

Figure 6:
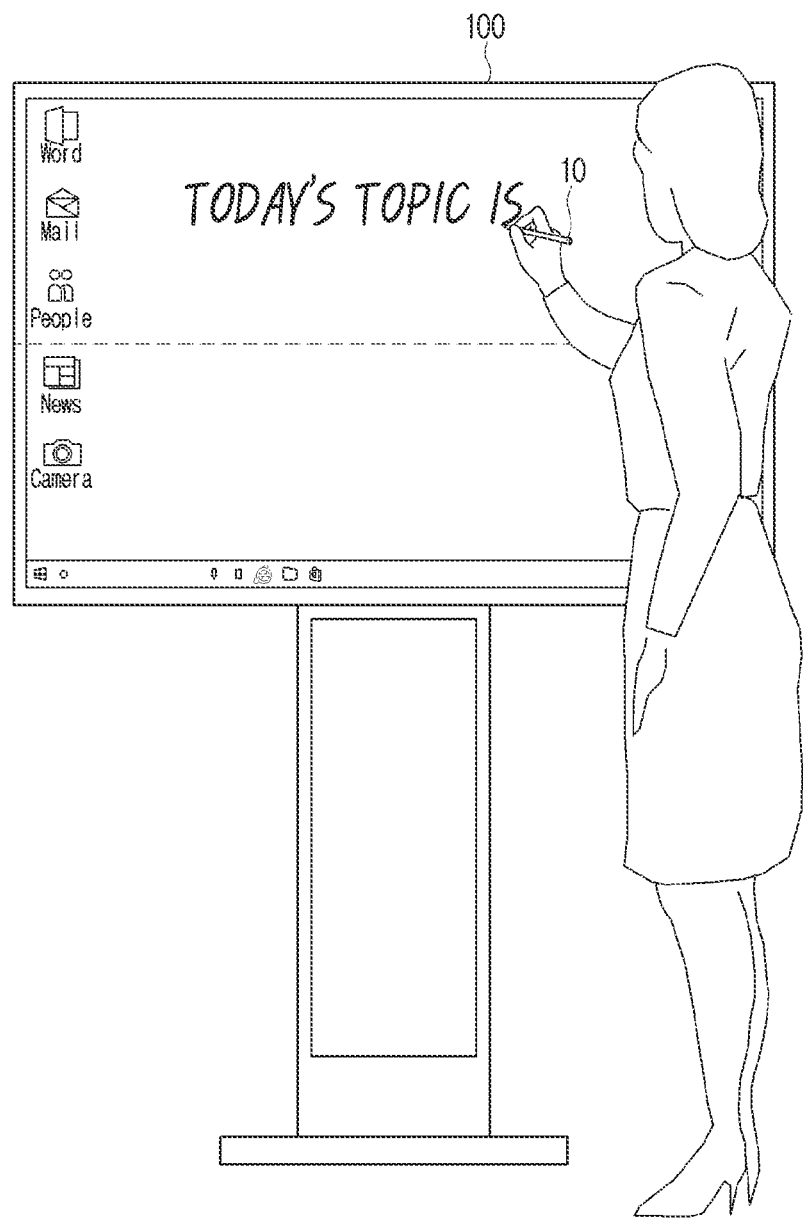
FIG. 6 and FIG. 7 are diagrams illustrating area information according to various embodiments.
Figure 7:
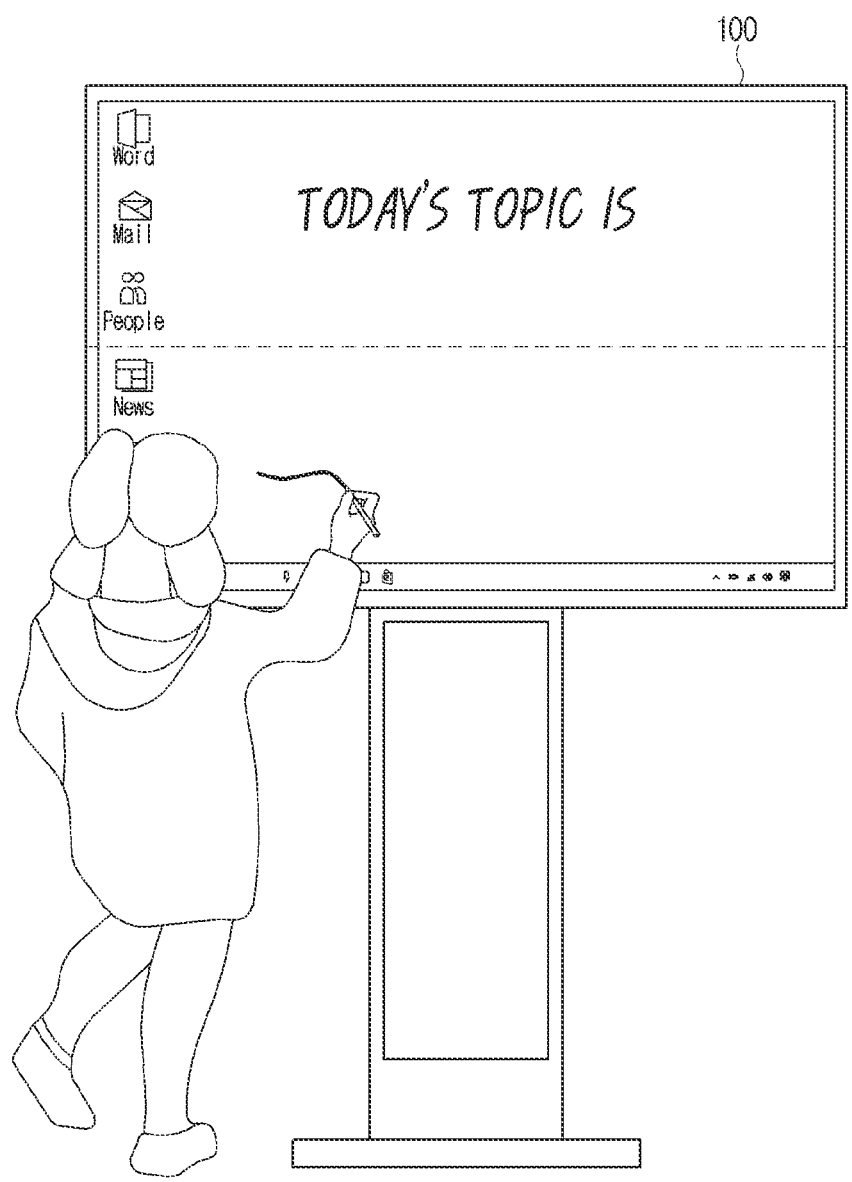

FIG. 6 and FIG. 7 are diagrams illustrating area information according to various embodiments.

The processor 120 according to an embodiment of the disclosure may determine whether to predict the subsequent trajectory 2 of the touch trajectory 1 and display the trajectory based on information on an area wherein a touch input was received. The area information may include an upper area or a lower area.

Referring to FIG. 6, if an area wherein a touch input was received is the upper area, the processor 120 according to an embodiment of the disclosure may display a touch trajectory corresponding to a subsequent touch input signal received from the touch sensor 111.

As another example, referring to FIG. 7, if an area wherein a touch input was received is the lower area, the processor 120 according to an embodiment of the disclosure may predict the subsequent trajectory 2 based on the displayed touch trajectory 1, and control the display panel 110 to display the trajectory.

The upper area may refer, for example, to the upper area of the dotted line crossing over the central area of the display panel 110 illustrated in FIG. 6, and the lower area may refer, for example, to the lower area of the dotted line.

For example, if an area wherein a touch input was received is the lower area, the user who input the touch may be relatively short, or may be a user who is young, and the touch input speed of such a user may be relatively slow. As another example, if an area wherein a touch input was received is the upper area, the user who input the touch may be relatively tall, or may be a user who is older, and the touch input speed of such a user may be relatively fast. According to such an assumption, FIG. 6 and FIG. 7 assume that the touch input speed will be relatively slow when an area wherein a touch input was received is the lower area than when an area wherein a touch input was received is the upper area, and illustrate that the processor 120 predicts the subsequent trajectory 2 and displays the trajectory when a touch input is detected in the lower area of the display panel 110. However, this is merely an example, and the disclosure is not limited thereto.

For example, if a touch input is detected in the upper area of the display panel 110, the processor 120 may predict the subsequent trajectory 2 and display the trajectory, and if a touch input is detected in the lower area, the processor 120 may display a touch trajectory corresponding to a subsequent touch input signal received from the touch sensor 111.

For example, according to the setting of the manufacturer or a user, the processor 120 may predict the subsequent trajectory 2 and display the trajectory limited to a case falling under any one of a case wherein a touch input is detected in the upper area or a case wherein a touch input is detected in the lower area.

Figure 8:
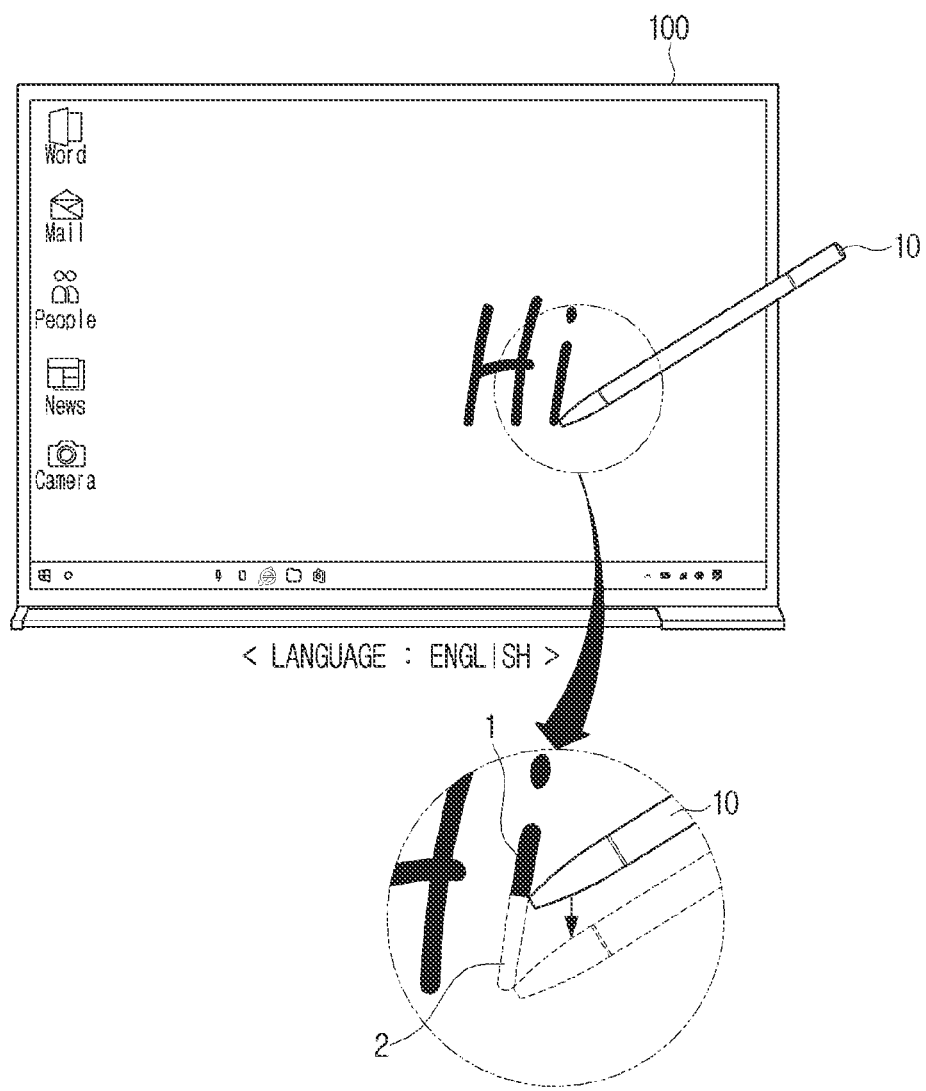
FIG. 8 and FIG. 9 are diagrams illustrating a set language according to various embodiments.
Figure 9:
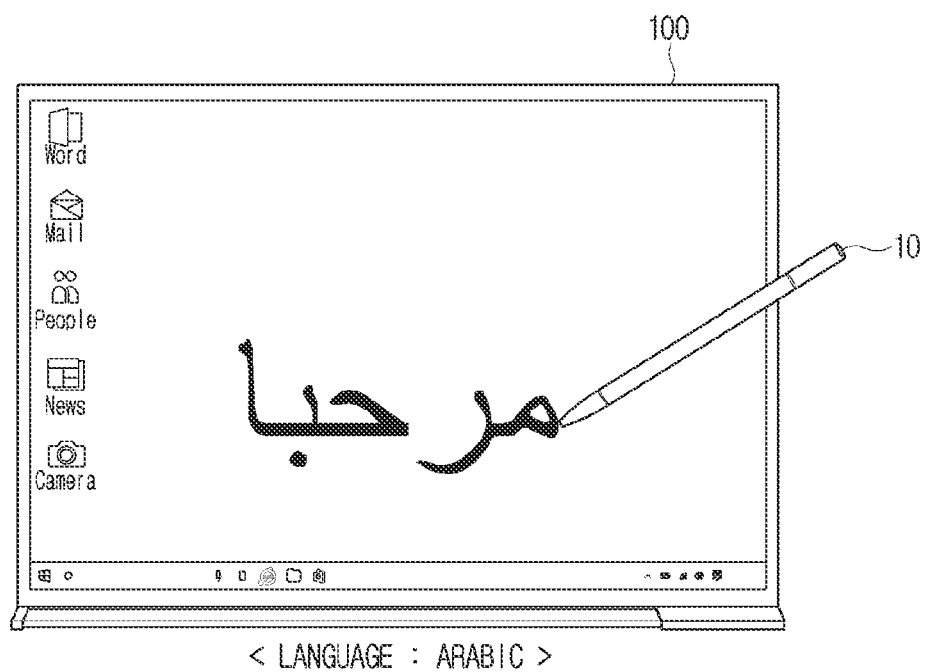

FIG. 8 and FIG. 9 are diagrams illustrating a set language according to various embodiments.

The processor 120 according to an embodiment may determine whether to predict the subsequent trajectory 2 of the touch trajectory 1 and display the trajectory based on a set language. The set language may include at least one of the main language set by a user or a language that the processor 120 identified based on the touch trajectory 1.

Referring to FIG. 8, the processor 120 according to an embodiment of the disclosure may identify 'English' as a set language based on the touch trajectory 1. According to an embodiment, 'English' may be a language set to predict the subsequent trajectory 2. In this case, the processor 120 may predict the subsequent trajectory 2 based on the displayed touch trajectory 1, and control the display panel 110 to display the trajectory. A language set to predict the subsequent trajectory 2 can be added variously, deleted, or changed according to the setting of the manufacturer or a user. For example, if it is identified that the touch trajectory 1 corresponds to a language using characters including straight lines or circles (e.g., English, Korean), the processor 120 may predict the subsequent trajectory 2 of the touch trajectory 1 and display the trajectory.

As another example, referring to FIG. 9, the processor 120 according to another embodiment of the disclosure may identify 'Arabic' as a set language based on the touch trajectory 1. According to an embodiment, 'Arabic' may not fall under a language set to predict the subsequent trajectory 2. In this case, the processor 120 may display a touch trajectory corresponding to a subsequent touch input signal received from the touch sensor 111, but not the subsequent trajectory 2. For example, 'Arabic' may fall under a language using characters relatively primarily including curved lines, but not straight lines or circles.

In this case, a difference greater than or equal to a threshold range is generated between the subsequent trajectory 2 and the touch input that the user actually input, e.g., a touch trajectory corresponding to a subsequent touch input signal, the processor 120 may display a touch trajectory corresponding to the subsequent touch that the user actually input, but not the predicted subsequent trajectory 2.

Figure 10:
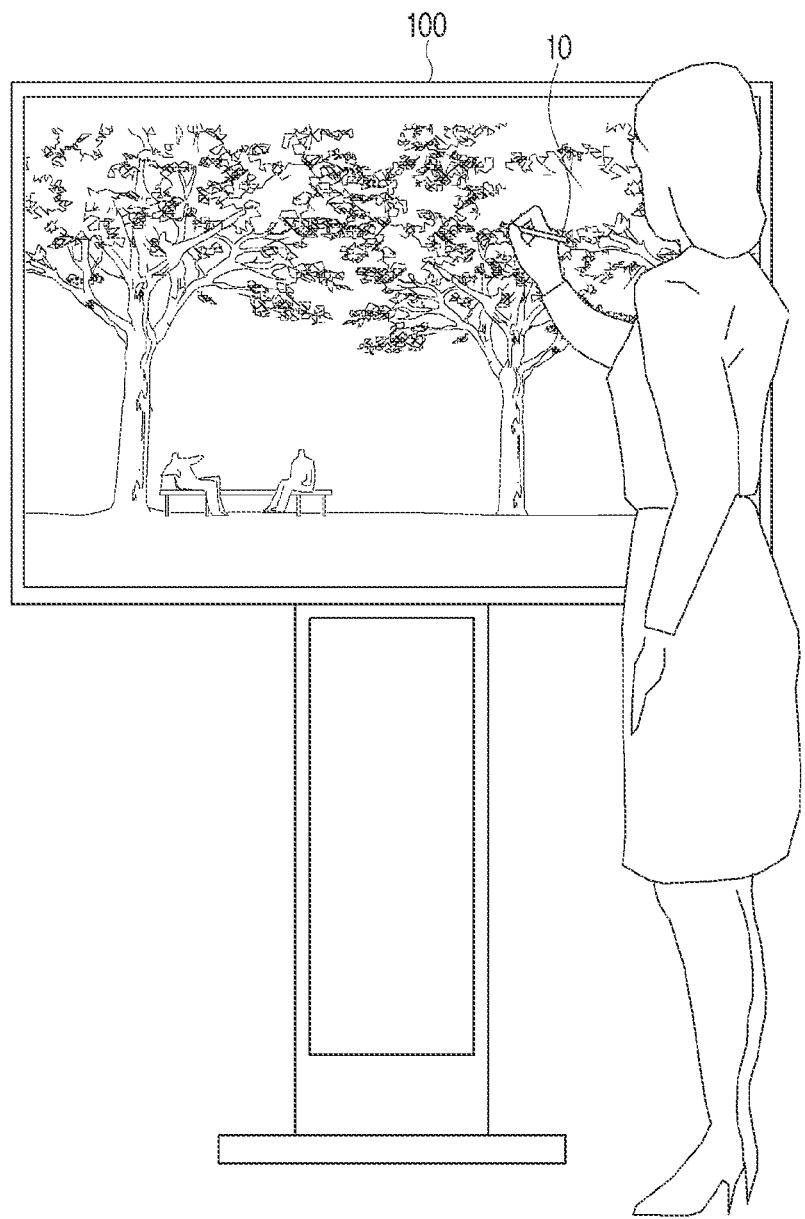
FIG. 10 and FIG. 11 are diagrams illustrating a content type according to various embodiments.
Figure 11:
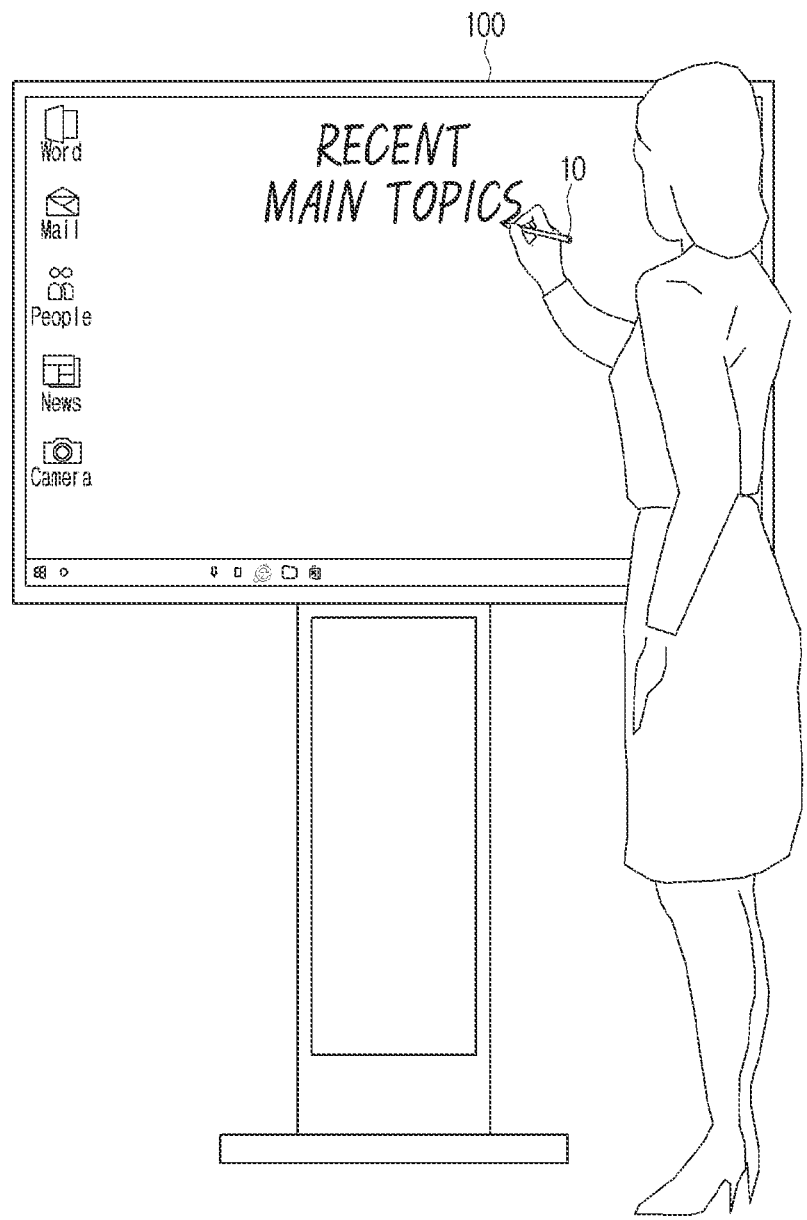

FIG. 10 and FIG. 11 are diagrams illustrating a content type according to various embodiments.

The processor 120 according to an embodiment of the disclosure may determine whether to predict the subsequent trajectory 2 of the touch trajectory 1 based on content type information corresponding to a touch input. For example, the content type information may include a text type or an image type.

Referring to FIG. 10, if the touch trajectory 1 displayed according to a user's touch input is the image type, the processor 120 according to an embodiment may predict the subsequent trajectory 2 based on the displayed touch trajectory 1, and control the display panel 110 to display the trajectory.

As another example, referring to FIG. 11, if the touch trajectory 1 is the text type, the processor 120 according to an embodiment may display a touch trajectory corresponding to a subsequent touch input signal received from the touch sensor 111, but not the predicted subsequent trajectory 2.

The processor 120 may analyze the displayed touch trajectory 1 and identify whether the content type is the image type or the text type, and according to a user setting, the processor 120 may also identify to which of the image type or the text type the displayed touch trajectory 1 belongs.

FIG. 10 and FIG. 11 assume that the touch input speed will be relatively slow when a touch corresponding to the image type wherein a detailed touch operation is required is input than when a touch corresponding to the text type is input, and illustrate that the processor 120 predicts the subsequent trajectory 2 and displays the trajectory when a content corresponding to the displayed touch trajectory 1 is the image type, for the convenience of explanation. However, this is merely an example, and the disclosure is not limited thereto. For example, if a content corresponding to a touch input is the text type, the processor 120 may predict the subsequent trajectory 2 and display the trajectory, and if a content corresponding to a touch input is the image type, the processor 120 may display a touch trajectory corresponding to a subsequent touch input signal received from the touch sensor 111.

For example, according to the setting of the manufacturer or a user, the processor 120 may predict the subsequent trajectory 2 and display the trajectory limited to a case wherein a touch input falls under any one of the image type or the text type.

A content type may be determined according to the mode of the display apparatus 100, other than the text type or the image type. For example, the display apparatus 100 may include various modes such as a calligraphy mode, a brush mode, a pencil mode, etc. Then, if a specific mode is selected as the mode of the display apparatus 100, the processor 120 may assume that the touch input speed will be relatively slower than other modes, and predict the subsequent trajectory 2 when a content corresponding to the displayed touch trajectory 1 is the image type, and display the trajectory. For example, if the display apparatus 100 is in the calligraphy mode, the processor 120 may predict the subsequent trajectory 2 corresponding to the touch trajectory 1 and display the trajectory.

FIGS. 3, 4, 5, 6, 7, 8, 9, 10 and 11 are based on the assumption of a case wherein the touch context information includes at least one of speed information, information on an arrangement mode of the display apparatus 100, information on an area wherein a touch input was received, information on a set language of the display apparatus 100, or information on a content type corresponding to a touch input, for the convenience of explanation. It was described that the processor 120 determines whether to display the subsequent trajectory 2 by independently considering the plurality of respective information included in the touch context information, but this is merely an example, and the disclosure is not limited thereto.

For example, if a value acquired by applying different weights to the plurality of respective information included in the touch context information exceeds a threshold value, the processor 120 may predict the subsequent trajectory 2 and display the trajectory.

As an example, if speed information corresponding to a touch input signal is less than the first threshold speed, the processor 120 may acquire 1, and if the speed information is greater than or equal to the first threshold speed, the processor 120 may acquire 0. Also, if the display apparatus is in the vertical mode based on the arrangement mode information, the processor 120 may acquire 1, and if the display apparatus is in the horizontal mode, the processor 120 may acquire 0. In addition, if an area wherein a touch input was received is the lower area based on the information on the area wherein the touch input was received, the processor 120 may acquire 1, and if the area is the upper area, the processor 120 may acquire 0. Further, if a set language is a language set to predict the subsequent trajectory 2 based on information on the set language, the processor 120 may acquire 1, and if the set language does not fall under this, the processor 120 may acquire 0. Also, if a content corresponding to a touch input is the image type, the processor 120 may acquire 1, and if the content is the text type, the processor 120 may acquire 0.

The processor 120 may sum up the acquired values, and if the value is greater than or equal to 3, the processor 120 may predict the subsequent trajectory 2 and display the trajectory, and if the value is less than 3, the processor 120 may display a touch trajectory corresponding to a subsequent touch input signal received from the touch sensor 111. However, this is merely an example, and various kinds of information may be included in the touch context information other than the aforementioned examples.

As an example, the memory may store use history information related to a touch input of the display panel 110, and the processor 120 may determine whether to display the subsequent trajectory 2 of the displayed touch trajectory 1 based on the use history information.

For example, the use history information may include user information, and the user information may include information on an average touch input speed (e.g., a speed of writing on a white board, a writing speed, etc.), information on a set language, information on a handwriting, information on a body (e.g., the age, the height, etc.) of each user.

The processor 120 according to an embodiment of the disclosure may acquire at least one of the information on the average touch input speed, the information on the set language, the information on the handwriting, or the information on the body corresponding to the user currently using the display apparatus 100 based on the use history information, and determine whether to display the subsequent trajectory 2 based on the acquired information. For example, if the user's age exceeds a threshold value based on the body information corresponding to the user, the processor 120 may assume that the touch speed will be relatively fast, and may not predict the subsequent trajectory 2. As another example, if the user's height exceeds a threshold value based on the body information corresponding to the user, the processor 120 may assume that an area wherein a touch input will be received will be the upper area, and may not predict the subsequent trajectory 2. However, a case on the contrary is possible according to the setting of the manufacturer or a user.

If a value acquired by applying different weights to the plurality of respective information included in the touch context information exceeds a threshold value based on the following formula 1, the processor 120 according to an embodiment of the disclosure may predict the subsequent trajectory 2 and display the trajectory.

$$Y = W1*P1 + W2*P2 + W3*P3 + \ldots \quad \text{[Formula 1]}$$

Here, P1 denotes an average speed of a touch input, P2 denotes the arrangement mode information of the display apparatus, and P3 denotes an area wherein a touch input was received, and W1, W2, and W3 respectively denote weight values different from one another. Meanwhile, P2 and P3 may have a value of 0 or 1, as described above.

If the Y value exceeds the threshold value, the processor 120 according to an embodiment may predict the subsequent trajectory 2 based on the touch trajectory 1. However, this is merely an example, and the parameter included in the formula 1 can increase according to the information included in the touch context information. For example, the processor 120 can determine whether to predict the subsequent trajectory 2 based on information on the area wherein the display apparatus 100 is included. As an example, if the illumination value of the area wherein the display apparatus 100 is included is detected through a sensor (not shown), the processor 120 may determine whether the illumination value is greater than or equal to a threshold value. If the illumination value is less than the threshold value, the processor 120 may assume that the touch input speed will be relatively slow as the area wherein the display apparatus 100 is included is rather dark, and predict the subsequent trajectory 2 of the touch trajectory 1, and display the trajectory. However, this is merely an example, and as another example, if the illumination value is greater than or equal to the threshold value, the processor 120 can predict the subsequent trajectory 2 of the touch trajectory 1 and display the trajectory, according to the setting of the manufacturer or a user.

Figure 12:
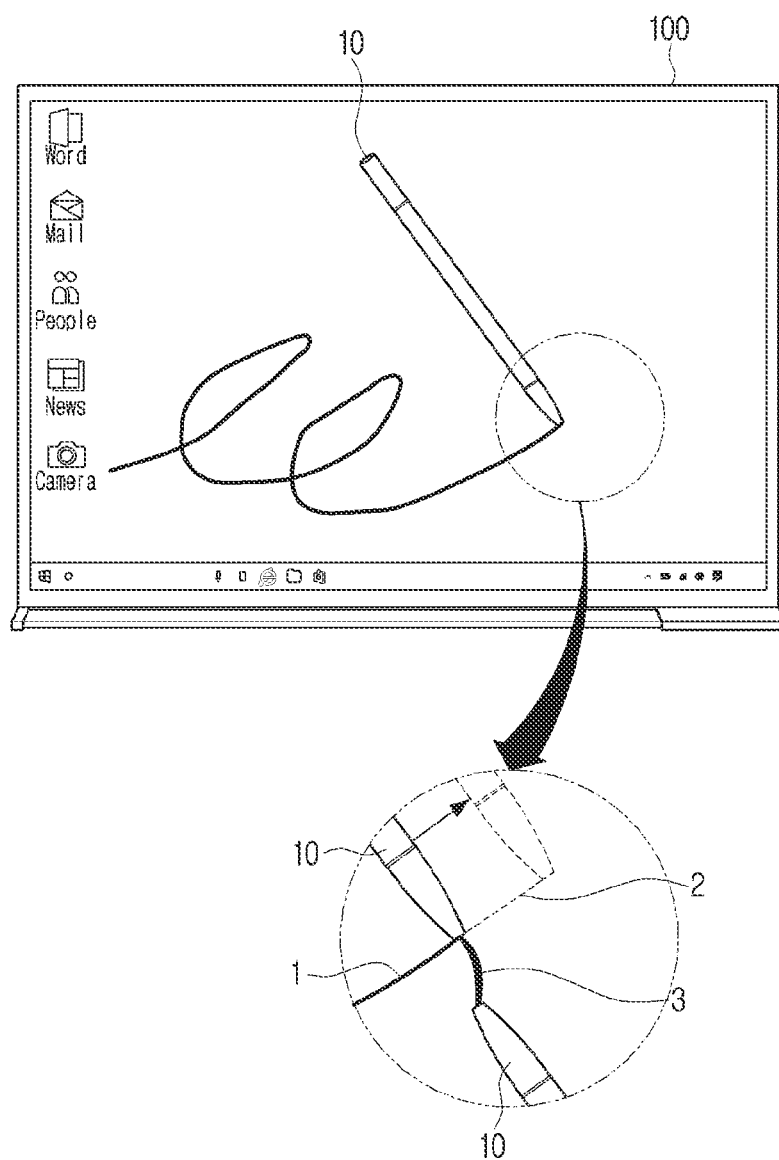
FIG. 12 is a diagram illustrating a touch trajectory according to various embodiments.

FIG. 12 is a diagram illustrating a touch trajectory according to various embodiments.

Referring to FIG. 12, after the subsequent trajectory 2 is displayed, if an error between a touch trajectory 3 corresponding to a subsequent touch input signal received from the touch sensor and the subsequent trajectory 2 exceeds a threshold range, the processor 120 according to an embodiment of the disclosure may replace the displayed subsequent trajectory 2 with the touch trajectory 3 corresponding to the touch input signal and control the display panel 110 to display the trajectory.

For example, as the subsequent trajectory 2 is a predicted trajectory, a case wherein a touch trajectory received according to an actual user touch input, e.g., the touch trajectory 3 corresponding to the subsequent touch input signal and the subsequent trajectory 2 are different may be assumed. If the error between the touch trajectory 3 corresponding to the subsequent touch input signal and the subsequent trajectory 2 exceeds the threshold range, the processor 120 may remove the displayed subsequent trajectory 2, and display the touch trajectory 3 corresponding to the touch input signal.

Figure 13:
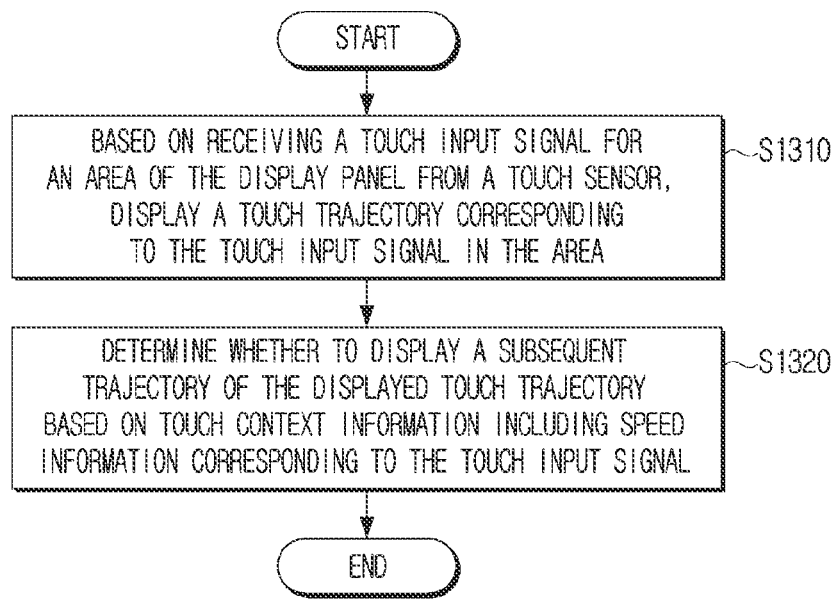
FIG. 13 is a flowchart illustrating an example method of controlling a display apparatus according to various embodiments.

FIG. 13 is a flowchart illustrating an example method of controlling a display apparatus according to various embodiments.

In a control method of a display apparatus including a display panel including a touch sensor according to an embodiment of the disclosure, first, if a touch input signal for an area of the display panel is received from the touch sensor, a touch trajectory corresponding to the touch input signal for the area is displayed in operation S1310.

It is determined whether to display a subsequent trajectory of the displayed touch trajectory based on touch context information including speed information corresponding to the touch input signal in operation S1320.

The control method according to an embodiment of the disclosure may further includes based on the speed information being less than a first threshold speed, predicting the subsequent trajectory based on the displayed touch trajectory and displaying the trajectory, and based on the speed information being greater than or equal to the first threshold speed, displaying a touch trajectory corresponding to a subsequent touch input signal received from the touch sensor.

Predicting the subsequent trajectory and displaying the trajectory may include, based on the speed information being less than the first threshold speed and greater than or equal to a second threshold speed, predicting a subsequent trajectory corresponding to a first area based on the displayed touch trajectory and displaying the trajectory, and based on the speed information being less than the second threshold speed, predicting a subsequent trajectory corresponding to a second area based on the displayed touch trajectory and displaying the trajectory. The size of the second area may be larger than the size of the first area.

The touch context information according to an embodiment may further include at least one of information on an arrangement mode of the display apparatus, information on an area wherein the touch input was received, information on a set language of the display apparatus, or information on a content type corresponding to the touch input.

The control method according to an embodiment may further include, based on a value acquired by applying different weights to the plurality of respective information included in the touch context information exceeding a threshold value, predicting the subsequent trajectory based on the displayed touch trajectory and displaying the trajectory.

The information on the arrangement mode of the display apparatus may include a horizontal mode or a vertical mode, and the control method according to an embodiment may further include, based on the display apparatus being in the vertical mode, predicting the subsequent trajectory based on the displayed touch trajectory and displaying the trajectory, and based on the display apparatus being in the horizontal mode, displaying a touch trajectory corresponding to the subsequent touch input signal received from the touch sensor.

The information on the area wherein the touch input was received according to an embodiment may include an upper area or a lower area, and the control method may further include, based on the area wherein the touch input was received being the lower area, predicting the subsequent trajectory based on the displayed touch trajectory and displaying the trajectory, and based on the area wherein the touch input was received being the upper area, displaying a touch trajectory corresponding to the subsequent touch input signal received from the touch sensor.

The information on the content type corresponding to the touch input according to an embodiment may include a text type or an image type, and the control method may further include, based on the content corresponding to the touch input being the image type, predicting the subsequent trajectory based on the displayed touch trajectory and displaying the trajectory, and based on the content corresponding to the touch input being the text type, displaying a touch trajectory corresponding to the subsequent touch input signal received from the touch sensor.

The control method according to an embodiment of the disclosure may further include, based on an error between the touch trajectory corresponding to the subsequent touch input signal received from the touch sensor and the subsequent trajectory exceeding a threshold range after the subsequent trajectory is displayed, replacing the displayed subsequent trajectory with the touch trajectory corresponding to the touch input signal and displaying the trajectory.

The display apparatus according to an embodiment of the disclosure may include use history information related to the touch input of the display panel, and the control method may further include determining whether to display a subsequent trajectory of the displayed touch trajectory based on the use history information.

The various example embodiments of the disclosure can be applied not only to electronic apparatuses, but also to all types of electronic apparatuses including a display.

The various embodiments described above may be implemented in a recording medium that is readable by a computer or an apparatus similar thereto, using software, hardware or a combination thereof. In some cases, the embodiments described in this disclosure may be implemented as a processor itself. According to implementation by software, the embodiments such as procedures and functions described in this disclosure may be implemented as separate software modules. Each of the software modules may perform one or more functions and operations described in this disclosure.

Computer instructions for performing the processing operations of the electronic apparatus 100 according to the various embodiments of the disclosure described above may be stored in a non-transitory computer-readable medium. Such computer instructions stored in a non-transitory computer-readable medium may make the processing operations at the electronic apparatus 100 according to the various embodiments described above performed by a specific machine, when they are executed by a processor of the specific machine.

A non-transitory computer-readable medium refers to a medium that stores data semi-permanently, and is readable by machines. Examples of a non-transitory computer-readable medium, there may include a CD, a DVD, a hard disc, a blue-ray disc, a USB, a memory card, a ROM and the like.

While the disclosure has been illustrated and described with reference to various example embodiments, it will be understood that the various example embodiments are intended to be illustrative, not limiting. It will be further understood by those skilled in the art that various modifications may be made, without departing from the true spirit and full scope of the disclosure including the appended claims and their equivalents. It will also be understood that any of the embodiment(s) described herein may be used in conjunction with any other embodiment(s) described herein.

What is claimed is:

1. A display apparatus comprising:
a display panel including a touch sensor; and
a processor configured to:
based on receiving a touch input signal for an area of the display panel from the touch sensor, control the display panel to display a touch trajectory corresponding to the touch input signal in the area, and
based on touch context information including speed information indicating a moving speed of a touch corresponding to the touch input signal, determine whether to display a subsequent trajectory of the displayed touch trajectory,
wherein the processor either, based on the moving speed of the touch according to the speed information being less than a first threshold speed, predicts the subsequent trajectory based on the displayed touch trajectory and displays the predicted subsequent trajectory, or based on the moving speed of the touch according to the speed information being greater than or equal to the first threshold speed, controls the display panel to display a touch trajectory corresponding to a subsequent touch input signal received from the touch sensor.

2. The display apparatus of claim 1,
wherein the processor is configured to:
based on the moving speed of the touch according to the speed information being less than the first threshold speed and greater than or equal to a second threshold speed, predict a subsequent trajectory corresponding to a first area based on the displayed touch trajectory and display the predicted subsequent trajectory corresponding to the first area, and
based on the moving speed of the touch according to the speed information being less than the second threshold speed, predict a subsequent trajectory corresponding to a second area based on the displayed touch trajectory and display the predicted subsequent trajectory corresponding to the second area, and
wherein a size of the second area is larger than a size of the first area.

3. The display apparatus of claim 1,
wherein the touch context information further includes at least one of information on an arrangement mode of the display apparatus, information on an area in which the touch input was received, information on a set language of the display apparatus, or information on a content type corresponding to the touch input.

4. The display apparatus of claim 3,
wherein the processor is configured to:
based on a value acquired by applying different weights to the plurality of respective information included in the touch context information exceeding a threshold value, predict the subsequent trajectory based on the displayed touch trajectory and display the predicted subsequent trajectory.

5. The display apparatus of claim 3, wherein the information on the arrangement mode of the display apparatus includes a horizontal mode or a vertical mode, and
the processor is configured to:
based on the display apparatus being in the vertical mode, predict the subsequent trajectory based on the displayed touch trajectory and control the display panel to display the predicted subsequent trajectory, and
based on the display apparatus being in the horizontal mode, control the display panel to display a touch trajectory corresponding to the subsequent touch input signal received from the touch sensor.

6. The display apparatus of claim 3,
wherein the information on the area in which the touch input was received includes an upper area or a lower area, and
the processor is configured to:
based on the area in which the touch input was received being the lower area, predict the subsequent trajectory based on the displayed touch trajectory and control the display panel to display the predicted subsequent trajectory, and
based on the area in which the touch input was received being the upper area, control the display panel to display a touch trajectory corresponding to the subsequent touch input signal received from the touch sensor.

7. The display apparatus of claim 3,
wherein the information on the content type corresponding to the touch input includes a text type or an image type, and
the processor is configured to:
based on the content corresponding to the touch input being the image type, predict the subsequent trajectory based on the displayed touch trajectory and control the display panel to display the predicted subsequent trajectory, and
based on the content corresponding to the touch input being the text type, control the display panel to display a touch trajectory corresponding to the subsequent touch input signal received from the touch sensor.

8. The display apparatus of claim 1,
wherein the processor is configured to:
based on the predicted subsequent trajectory being displayed, based on an error between the touch trajectory corresponding to the subsequent touch input signal received from the touch sensor and the predicted subsequent trajectory exceeding a threshold range, replace the predicted subsequent trajectory with the touch trajectory corresponding to the subsequent touch input signal to display the touch trajectory.

9. The display apparatus of claim 1, further comprising:
a memory storing use history information related to the touch input of the display panel,
wherein the processor is configured to:
determine whether to display the predicted subsequent trajectory based on the use history information.

10. A method of controlling a display apparatus including a display panel including a touch sensor, the method comprising:
based on receiving a touch input signal for an area of the display panel from the touch sensor, displaying a touch trajectory corresponding to the touch input signal for the area; and
based on touch context information including speed information indicating a moving speed of a touch corresponding to the touch input signal, determining whether to display a subsequent trajectory of the displayed touch trajectory, and
wherein the method further comprising:

either, based on the moving speed of the touch according to the speed information being less than a first threshold speed, predicting the subsequent trajectory based on the displayed touch trajectory and displaying the predicted subsequent trajectory, or based on the moving speed of the touch according to the speed information being greater than or equal to the first threshold speed, displaying a touch trajectory corresponding to a subsequent touch input signal received from the touch sensor.

11. The method of claim 10,
wherein the predicting the subsequent trajectory and displaying the predicted subsequent trajectory comprises:
based on the moving speed of the touch according to the speed information being less than the first threshold speed and greater than or equal to a second threshold speed, predicting a subsequent trajectory corresponding to a first area based on the displayed touch trajectory and displaying the predicted subsequent trajectory corresponding to the first area; and
based on the moving speed of the touch according to the speed information being less than the second threshold speed, predicting a subsequent trajectory corresponding to a second area based on the displayed touch trajectory and displaying the predicted subsequent trajectory corresponding to the second area, and
wherein a size of the second area is larger than a size of the first area.

12. The method of claim 10,
wherein the touch context information further includes at least one of information on an arrangement mode of the display apparatus, information on an area wherein the touch input was received, information on a set language of the display apparatus, or information on a content type corresponding to the touch input.

13. The method of claim 12, further comprising:
based on a value acquired by applying different weights to the plurality of respective information included in the touch context information exceeding a threshold value, predicting the subsequent trajectory based on the displayed touch trajectory and displaying the predicted subsequent trajectory.

14. The method of claim 12, further comprising:
wherein the information on the arrangement mode of the display apparatus includes a horizontal mode or a vertical mode, and
based on the display apparatus being in the vertical mode, predicting the subsequent trajectory based on the displayed touch trajectory and control the display panel to display the predicted subsequent trajectory, and
based on the display apparatus being in the horizontal mode, displaying a touch trajectory corresponding to the subsequent touch input signal received from the touch sensor.

15. The method of claim 12, further comprising: wherein the information on the area in which the touch input was received includes an upper area or a lower area, and
based on the area in which the touch input was received being the lower area, predicting the subsequent trajectory based on the displayed touch trajectory and control the display panel to display the predicted subsequent trajectory, and
based on the area in which the touch input was received being the upper area, displaying a touch trajectory corresponding to the subsequent touch input signal received from the touch sensor.

16. The method of claim 12, further comprising:
wherein the information on the content type corresponding to the touch input includes a text type or an image type, and
based on the content corresponding to the touch input being the image type, predicting the subsequent trajectory based on the displayed touch trajectory and control the display panel to display the predicted subsequent trajectory, and
based on the content corresponding to the touch input being the text type, displaying a touch trajectory corresponding to the subsequent touch input signal received from the touch sensor.

17. The method of claim 10, further comprising:
based on the predicted subsequent trajectory being displayed, based on an error between the touch trajectory corresponding to the subsequent touch input signal received from the touch sensor and the predicted subsequent trajectory exceeding a threshold range, replacing the predicted subsequent trajectory with the touch trajectory corresponding to the subsequent touch input signal and displaying the touch trajectory.

18. The method of claim 10, further comprising:
a memory storing use history information related to the touch input of the display panel,
determining whether to display the predicted subsequent trajectory based on use history information.

* * * * *